United States Patent
Vertegaal (10) Patent No.: US 9,983,673 B2
(45) Date of Patent: May 29, 2018

(54) HAPTIC RENDERING FOR A FLEXIBLE COMPUTING DEVICE

(71) Applicant: Queen's University at Kingston, Kingston (CA)

(72) Inventor: Roel Vertegaal, Perth Road (CA)

(73) Assignee: Queen's University at Kingston, Kingston, ON (CA)

(*) Notice: Subject to any disclaimer, the term of this patent is extended or adjusted under 35 U.S.C. 154(b) by 0 days. days.

(21) Appl. No.: 15/071,626

(22) Filed: Mar. 16, 2016

(65) Prior Publication Data

US 2016/0328017 A1    Nov. 10, 2016

Related U.S. Application Data

(60) Provisional application No. 62/134,268, filed on Mar. 17, 2015, provisional application No. 62/294,357, filed on Feb. 12, 2016.

(51) Int. Cl.
| | | |
|---|---|---|
| *H04B 3/36* | (2006.01) | |
| *G06F 3/01* | (2006.01) | |
| *G06F 1/16* | (2006.01) | |
| *G08B 6/00* | (2006.01) | |

(52) U.S. Cl.
CPC ........... *G06F 3/016* (2013.01); *G06F 1/1626* (2013.01); *G06F 1/1652* (2013.01); *G08B 6/00* (2013.01)

(58) Field of Classification Search
CPC ...... G06F 1/1626; G06F 1/1652; G06F 3/016; G08B 6/00
USPC .............. 340/407.1, 407.2; 345/173, 174
See application file for complete search history.

(56) References Cited

U.S. PATENT DOCUMENTS

| | | | |
|---|---|---|---|
| 2013/0009882 A1* | 1/2013 | Salmela .................. | G06F 3/016 345/173 |
| 2013/0250502 A1* | 9/2013 | Tossavainen ........... | G06F 3/016 361/679.01 |
| 2014/0197936 A1* | 7/2014 | Biggs ....................... | G08B 6/00 340/407.1 |
| 2014/0320393 A1 | 10/2014 | Modarres et al. | |
| 2014/0320400 A1 | 10/2014 | Jiang et al. | |
| 2014/0320431 A1 | 10/2014 | Cruz-Hernandez et al. | |
| 2014/0320436 A1 | 10/2014 | Modarres et al. | |
| 2014/0347283 A1 | 11/2014 | Kim et al. | |
| 2014/0368440 A1* | 12/2014 | Polyakov .............. | G06F 1/1626 345/173 |
| 2015/0185848 A1 | 7/2015 | Levesque et al. | |
| 2015/0253848 A1 | 9/2015 | Heubel et al. | |

(Continued)

OTHER PUBLICATIONS

Kildal, J., "3-D Press: Haptic Illusion of Compliance when Pressing on a Rigid Surface", International Conference on Multimodal Interfaces and the Workshop on Machine Learning for Multimodal Interaction (ICMI-MLMI 2010). ACM, New York, NY, USA, Article 21, 6 pages.

(Continued)

*Primary Examiner* — Ojiako Nwugo
(74) *Attorney, Agent, or Firm* — Stephen J. Scribner (57) ABSTRACT

A flexible computing device with bend input and active haptic feedback that provides vibro-tactile sensations such as friction and resistance to a user. The sensations include vibrations that simulate a physical affordance of content displayed on the flexible computing device. In one embodiment the device is a smartphone.

20 Claims, 5 Drawing Sheets

(56) References Cited

U.S. PATENT DOCUMENTS

2015/0268725 A1    9/2015  Levesque et al.
2017/0024013 A1*   1/2017  Cruz-Hernandez ..... G06F 3/016

OTHER PUBLICATIONS

Kildal, J. et al., "Kinetic device: designing interactions with a deformable mobile interface", CHI '12 Extended Abstracts on Human Factors in Computing Systems (CHI EA 2012). ACM, New York, NY, USA, 1871-1876.
Kildal, J. et al., "Feeling it: the roles of stiffness, deformation range and feedback in the control of deformable UI", Proceedings of the 14th ACM international conference on Multimodal interaction (ICMI 2012). ACM, New York, NY, USA, 393-400.
Lahey, B et al., "PaperPhone: understanding the use of bend gestures in mobile devices with flexible electronic paper displays", Proceedings of the SIGCHI Conference on Human Factors in Computing Systems (CHI 2011). ACM, New York, NY, USA, 1303-1312.
Nakagawa, Y. et al., "MimicTile: a variable stiffness deformable user interface for mobile devices", Proceedings of the SIGCHI Conference on Human Factors in Computing Systems (CHI 2012). ACM, New York, NY, USA, 745-748.
Srinivasan, M.A. et al., "The Impact of Visual Information on the Haptic Perception of Stiffness in Virtual Environments", Proceedings of ASME Dynamic Systems and Control Division (1996), 58, 555-559.
Haptuator Original, Pamphlet, Tactile Labs, Hapuator Mark II, 2012.
Omega Engineering, Pamphlet, Strain Gages. 2015.
Schwesig, C. et al., "Gummi: a bendable computer", SIGCHI Conference on Human Factors in Computing Systems (CHI 2004). ACM, New York, NY, USA, 263-270.

* cited by examiner

HAPTIC RENDERING FOR A FLEXIBLE COMPUTING DEVICE

RELATED APPLICATIONS

This application claims the benefit of the filing date of U.S. Patent Application No. 62/134,268, filed on Mar. 17, 2015, and U.S. Patent Application No. 62/294,357, filed on Feb. 12, 2016, the contents of which are incorporated herein by reference in their entirety.

FIELD

The invention relates to methods and apparatus for providing flexible computing devices with haptic feedback. In particular, the methods and apparatus provide haptic feedback as vibrations that simulate a physical affordance of content displayed on the flexible computing device.

BACKGROUND

When presented with a tool or a device, we assess its features and attributes to understand what we can do with it, i.e., its perceived affordances. Visual inspection alone cannot convey all of this information and it is often necessary to feel an object to gain a fuller understanding of its material and structural properties. These qualities are perceived through tactile stimulation (e.g., on skin) and kinesthetic receptors (e.g., in hands). When an object is deformed, a rich set of sensations come into play to inform a user about its internal structure. For example, when reading a paper document, the physical structure of pages can help guide a user to particular locations in the document. A book can have physical tabs to indicate chapters and its pages might have "dog ears" to denote bookmarks or creases at frequently read passages. The distribution of pages between the hands of the user provides haptic representation of the current reading location. Pages sliding between the user's fingers provide feedback on the speed with which the user is navigating.

However, many, if not all, of these haptic affordances are lost when navigating documents on rigid devices such as smartphones and tablet PCs. When designing flexible organic user interfaces, the structural qualities of the device are inherited from the material of the substrate used in its construction. While haptic technologies have been used to mimic textures of different materials, these technologies often focus on surface features.

SUMMARY

Described herein is a method for providing haptic feedback on a flexible computing device, comprising: generating a sequence of pulses; modulating the pulses in accordance with an amount of flexing of the computing device; and using the modulated pulses to produce vibrations through the computing device; wherein the vibrations simulate a physical affordance of content displayed on the flexible computing device.

In one embodiment, modulating comprises: varying amplitude of the pulses in accordance with an amount of flexing of the computing device; filtering the pulses; and using the filtered pulses to produce vibrations through the computing device.

In one embodiment, filtering comprises: filtering the pulses using a band pass filter, wherein a center frequency of the band pass filter is adjusted in accordance with an amount of flexing of the computing device.

In one embodiment, modulating comprises: increasing the amplitude of the pulses as the amount of flexing of the device increases; wherein intensity of vibration of the device increases as the amount of flexing of the device increases.

One embodiment includes increasing the center frequency of the band pass filter as the amount of flexing of the device increases. One embodiment includes using a bend sensor to sense flexing of the flexible computing device.

In one embodiment, the simulation includes simulating stretching of a rubber band.

Also described herein is a flexible computing device, comprising: a sensor that senses flexing of the device; a pulse generator that generates a sequence of pulses; a processor that modulates the pulses in accordance with an amount of flexing of the computing device as sensed by the sensor; and an electromechanical device that produces vibrations in the device from the modulated pulses.

One embodiment comprises a filter that filters the pulses. In one embodiment, the filter comprises a band pass filter, wherein a center frequency of the band pass filter is adjusted in accordance with the amount of flexing of the computing device as sensed by the sensor. In one embodiment, the center frequency of the band pass filter is increased as the amount of flexing of the device increases.

In one embodiment, amplitude of the pulses is increased as the amount of flexing of the device increases; wherein intensity of vibration of the device increases as the amount of flexing of the device increases.

The embodiments may include a flexible display. The electromechanical device may comprise at least one of: a voice coil, a piezo speaker, a magnetic speaker, and a vibration unit.

In the embodiments, the flexible computing device comprises a smartphone, a tablet personal computer, a personal digital assistant, a music player, a gaming device, or a combination thereof.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1:
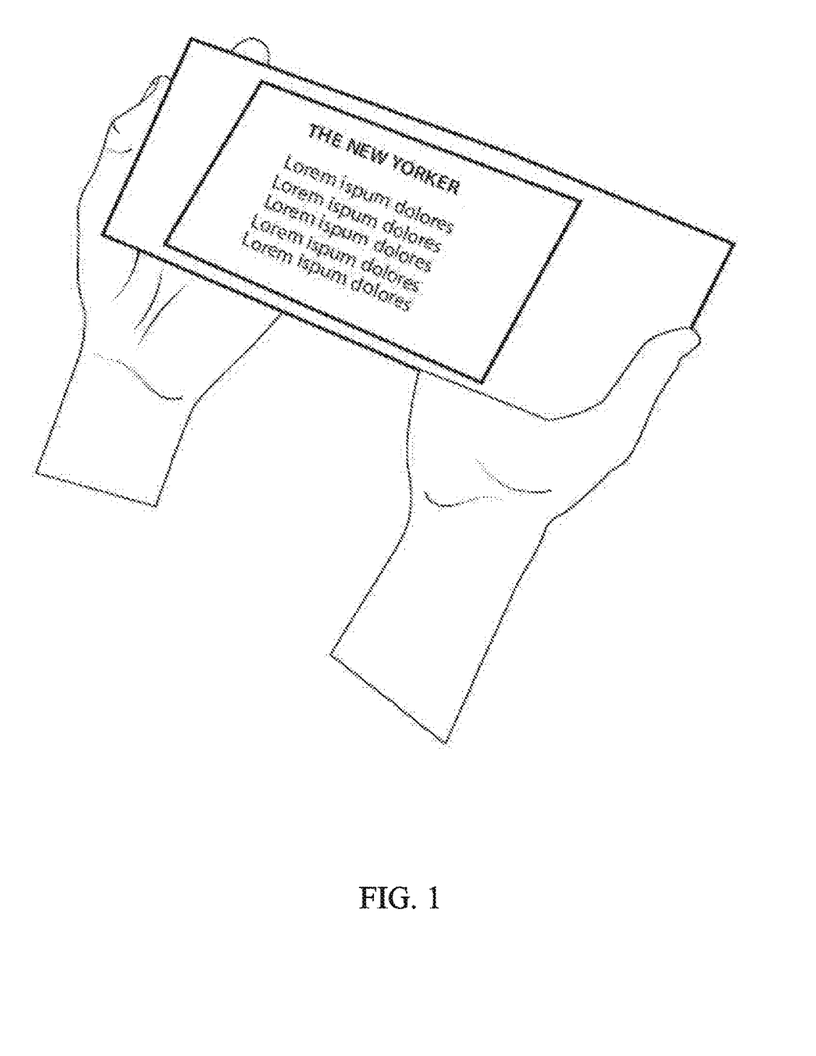
FIG. 1 is a photograph of a flexible haptic smartphone, according to one embodiment.

Described herein is a flexible computing device featuring a flexible display and a haptic actuator (FIG. 1). The flexible computing device may be a personal electronic device such as a smartphone, a gaming device, etc. In one embodiment, the device modifies the experience of dry friction when bending the device, as perceived through tactile receptors of the fingers. This feedback creates possibilities for new interactive experiences, such as simulating the elastic and material sensations that occur while navigating a paper book. Embodiments described herein may be implemented using position control and rate control in combination with different types of haptic feedback in a target acquisition task. One embodiment provides relative haptic feedback with position control and absolute haptic feedback with rate control.

Some embodiments are based, at least in part, on the discovery that implementing two or more haptic feedback mechanisms with a bending action on a device produces a simulation of dry friction when bending the device. An embodiment may be implemented with passive force feedback and actuated vibro-tactile feedback, for bending input. The interaction between these feedback mechanisms simulates the feeling of dry friction in the device during bending, as experienced by the user.

Passive Haptic Feedback

When using a touch screen, kinesthetic feedback provided by the configuration of the user's arm is largely independent of touch location. Compared to such traditional touch interaction, a device as described herein uses passive force feedback to provide a strong coupling of proprioceptive feedback with bend input. For example, the device provides a linear correspondence between the applied force and position or speed of a cursor.

Active Haptic Feedback

Embodiments provide multisensory feedback and facilitate the interplay between visual, tactile and kinesthetic experiences. For example, a flexible display is augmented with a haptic actuator that provides active feedback in addition to the passive elastic forces generated by the device when bent. This enables active modulation of the passive haptic feedback experienced by bending the device, generating variations in the perceived elasticity and internal structure of the device.

Implementation

Figure 2:
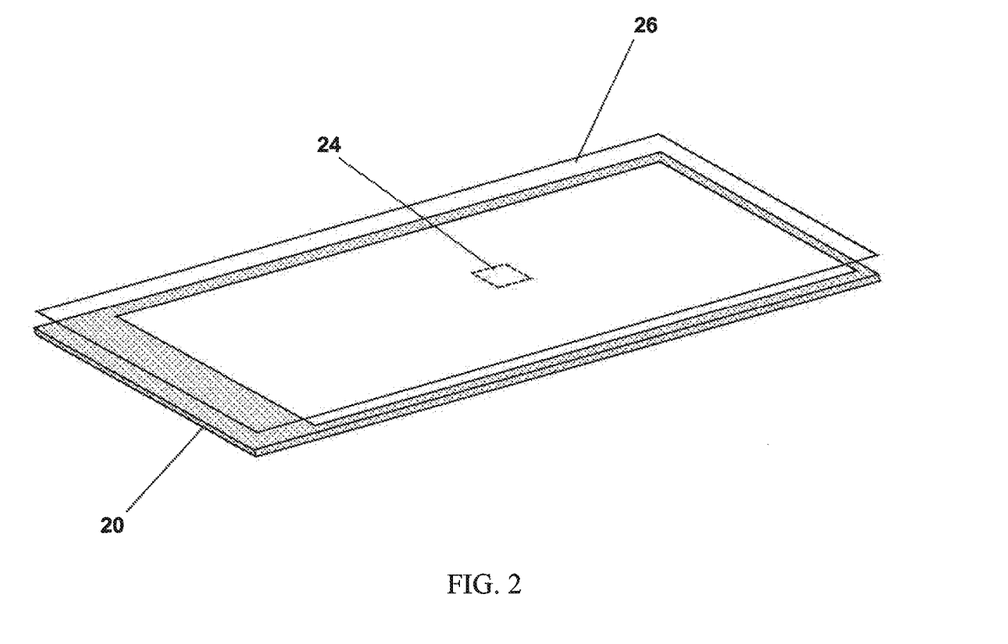
FIG. 2 is a diagram showing partial structure of a flexible haptic device, according to one embodiment.
Figure 3A:
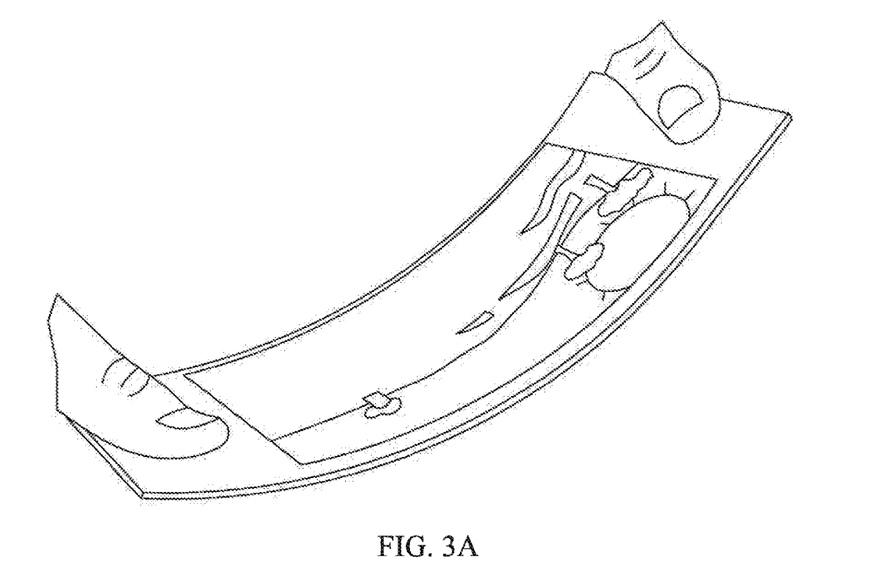
FIGS. 3A and 3B are photographs of a flexible haptic smartphone according to one embodiment, showing concave and convex bending, respectively.
Figure 3B:
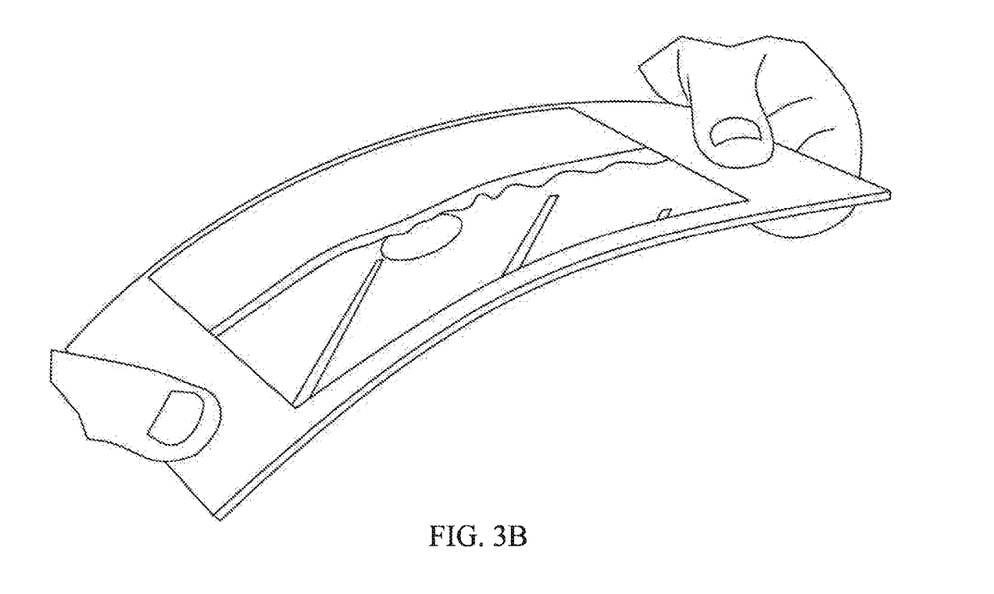

One embodiment is based on a flexible smartphone prototype with a bend sensor and haptic actuator. A simplified diagram is shown in FIG. 2. The prototype may be used as a stand-alone device and runs Android 4.2. A flexible organic LED (FOLED) display 20 (LG Display Co., Ltd.) was used. The 6.0" (135 mm×77 mm) FOLED display had a resolution of 1280×720 pixels and a refresh rate of 60 Hz. The display was mounted on a flexible substrate that extended 5 cm to left and right (as can be seen in FIG. 1). This allowed for a comfortable grip without occluding the display, and provided a location for rigid electronics, such as the processor and display driver board. The structural substrate of the device was designed so that it was most flexible at its center, tapering off towards semi-rigid ends. This was accomplished by adding trapezoidal reinforcements on both ends of the device (as can be seen in FIG. 3B). The direction and extent of a bend was measured with a bend sensor 24, implemented with an Omega Engineering strain gauge (www.omega.ca/guides/straingages-accessories.html/) placed at a location coinciding with the center of the display. A processor (Teensy 3.1 microcontroller, PJRC.COM, LLC) sampled the strain gauge at 12 bits and ~2,000 times per second. The high temporal and spatial resolution of the strain gauge allowed the haptic actuation to be synchronized with the passive haptics that were naturally present when bending the device. The device also had a multi-touch sensor layer 26, and a button on the back of the device (not shown).

Haptic Output

Active haptic feedback was generated using a Tactile Labs Haptuator (www.tactilelabs.com/products/haptics/haptuator-mark-ii-v2/) mounted on the back of the device, parallel to the length of the display. A vibrotactile transducer, rather than a vibrational motor, was used for precise temporal control of haptic signals. The Haptuator generates precise discrete pulses at an acceleration of up to 73 m/s$^2$ and at rates up to 1,000 Hz. Discrete pulses are inaudible, and a continuous series of pulses are audible only above ~500 Hz. The Haptuator is meant to be driven by a standard audio amplifier. However, in this embodiment it was driven by the sound card of the computer running the experimental software.

Software

An algorithm polled the Teensy microcontroller for bend sensor values and converted so them into cursor movement 200 times per second. It then generated audio signals for the Haptuator based on the haptic rendering algorithms below. The device ran an Android client application that drew the cursor and target information and rendered the haptic pulses through an audio output connected to an amplification circuit and the Haptuator.

Bend Input Mappings

Two different types of cursor control were used, following the definitions put forward by Zhai (Zhai, S., 1995, *Human Performance in Six Degree of Freedom input Control*. Ph.D Dissertation, University of Toronto, Toronto, ON).

Position Control (PC): As used herein, position control means that sensor values are directly mapped to pixels on the display's x-axis, i.e., the cursor position ($p_c$) is linearly proportional to the amount of bend (x) applied to the device:

$$p_c(x)=x$$

When the device is flat, the cursor is in the center of the display. The cursor is at the left extremity of the display when the device is fully convex, and on the right extremity when the device is fully concave. This mapping creates a linear correspondence between passive kinesthetic feedback and the visual position of the cursor on the display.

Rate Control (RC): With rate control, the user controls position of the cursor by manipulating its speed and direction via bend gestures. The direction of movement is same as in Position Control. The speed at which the cursor moves ($r_c$) is mapped to the extent of the bend with the following sinusoidal easing function:

$$r_c(x) = -\cos\left(x * \frac{\pi}{2}\right)+1, x:\ [0, 1]$$

Haptic Feedback Algorithm

Active tactile feedback was created using an audio signal consisting of a train of discrete pulses, and modulating the pulse train. Modulating may include, but is not limited to, one or more of filtering, including varying filter characteristics, varying pulse amplitude, and varying pulse frequency and/or duty cycle. For example, a high-pass filter (at, e.g., 100 Hz) may be applied to the pulse signal to remove any low frequency elements, helping each pulse to become more distinct. Also, for example, a low-pass filter (at, e.g., 400 Hz) may be applied to the pulse signal helped to attenuate the audibility of the signal.

The amplitude of the pulse signal was modulated so the haptic pulses would be felt stronger at the extremes of bend input (~160 db) and weaker when the device was close to rest (~110 db). This amplitude modulation increased the perceived strain linearly with the extent of the bend.

In one embodiment, a narrow-band (resonant) band pass filter was applied to the overall pulse train resulting from the above algorithm. Note that the previous low and high pass filters only modify the shape of the pulse, not the overall pulse train signal, whereas the band pass filter was applied to the overall pulse train. Moving the center frequency of the band pass filter simulates the vibro-tactile sensation of stretching a rubber band. The center frequency if this bandpass filter was modulated linearly with the extent of the bend, as follows:

$$f_c = f_a + x$$

Wherein $f_c$ is the center frequency of the band pass filter, $f_a$ is a base frequency of the band pass filter (in one embodiment, set to 550 Hz), and x relates to the extent of the bend, as provided by the bend sensor with a multiplication factor, wherein x=0 represents the device in a rest state, x<0 represents bends on the left side of the device, and x>0 represents bends on the right side of the device. x is linearly related to the extent of the bend as reported by the sensor. In one embodiment, the minimum x was −250 (Hz) and the maximum was +250 (Hz). In one embodiment the width of the bandpass filter was set to 200 Hz.

Two types of bend input were used to haptic feedback mappings, as explained below. Depending on the mapping, a haptic illusion of altered material properties was created.

Haptic Feedback Mapping Types

Absolute Bend Feedback (A): In this mapping, the rate of the pulse train ($r_p$) varied linearly with the extent of bend (x). The more extreme the bend, the higher the pulse train rate:

$$r_p(x) = x$$

The duty cycle of the pulse train was 50% for all rates. When this mapping was combined with a rate controlled cursor (A-RC), the pulse rate varied with the speed of the cursor. This created the feeling that fixed locations on the display trigger haptic pulses when the cursor passes over them. On the other hand, when this mapping was combined with cursor position control (A-PC), the synchronization between cursor location and haptic pulses was lost. The device simply pulsed faster the further it was bent.

Relative Bend Feedback (R): for this mapping, the pulse train is not necessarily periodic. Instead, its rate varied linearly with the speed of the bend movement, i.e., the bend velocity:

$$r_p(x) = \frac{\Delta x}{\Delta t}$$

Each single pulse of the train is a 1 ms length square pulse. When combining this mapping with cursor position control (R-PC), absolute locations on the display seem to trigger haptic pulses as the cursor passes over them. Conversely, when using rate control (R-RC), the pulse rate seems to be synchronized with the acceleration of the cursor.

Affordances

The comments of users of the prototype confirmed that the device was capable of eliciting haptic sensations beyond what was expected of traditional vibro-tactile feedback. The interplay between the passive force feedback and active tactile feedback of the device provide perceived physical affordances that can be controlled to match the requirements of the task at hand. These affordances emulate mechanisms that are familiar from the physical world. For example, in the same way as the length of a book may be assessed by bending it and flipping through its pages, a shorter digital document would generate less haptic pulses than a longer document when the device is bent. Frequency of pulses simulate page-flipping speed. These methods can also provide implicit information of one's usage history: just as a physical book tends to open to a section that a reader has studied intently, a user may be guided to the most visited sections in a digital document by varying the perceived separation between pages—i.e., the consecutive haptic pulses. The haptic feedback methods described herein are suitable for providing a user with haptic renderings of content, inspired by the physical affordances and wear and tear of physical media.

Haptic Qualities for Reading

Improving the affordances of digital documents to better facilitate within-document navigation is of increasing importance, as digital devices such as iPad and Kindle become more popular for reading magazines and books. While using such devices to access digital documents has numerous advantages, there are downsides to not using paper in reading tasks. For example, the haptic affordances of paper provide users with serendipitous within-document navigation methods that are lost in reading digital documents. A flexible device that combines active and passive haptic feedback, as described herein, may provide improved within-document navigation for digital documents, and enhance the user's experience. The affordances of a device as described herein may be used to support the types of serendipitous navigation that we are accustomed to from paper documents, in a form suitable for digital content.

Sample Applications

Exemplary applications that take advantage of active and passive haptic feedback are described below.

Figure 4A:
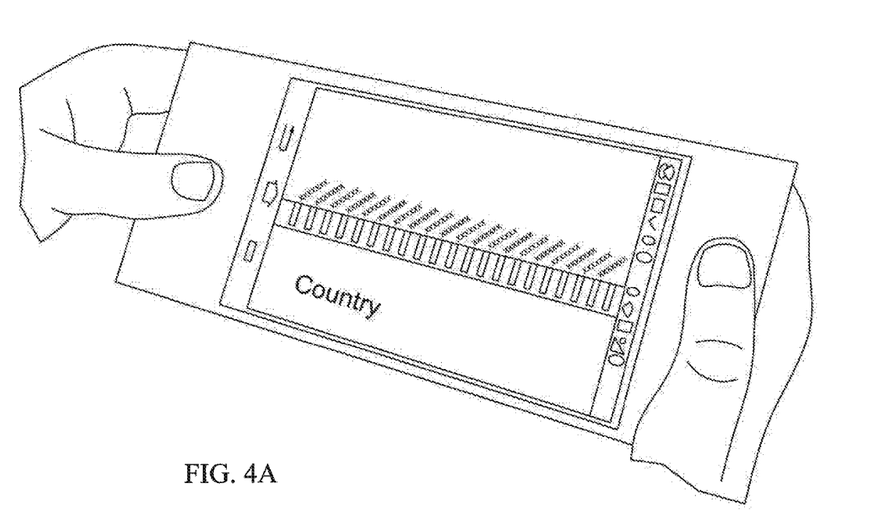
FIG. 4A is a photograph of a flexible haptic smartphone showing use off-screen scrolling of a large list, and item selection for selecting onscreen items in the list, according to one embodiment.

Large List Navigation: Rate control and position control can act synergistically for bend based input. Precise on-screen targeting actions can use a position-controlled cursor, while off-screen actions that require fast motion or continuous input, such as scrolling, are better suited for rate control. A scenario that takes advantage of this technique is navigation through large lists. FIG. 4A shows a user navigating a large list with bending gestures, using rate control for off-screen list browsing and position control when selecting on-screen items from the list. Users can select rate control by, e.g., pressing and holding the back-of-the-device button during bends. When the button is released, the device uses position control. Items are selected from the list with a click of the button in both cases. The haptic feedback switches between absolute and relative such that pulses always occur at the transition between items on the list. For item selection (R-PC) these are experienced as physical obstacles the cursor moves over, and for off-screen scrolling (A-RC) users experience obstacles as items enter the display.

Figure 4B:
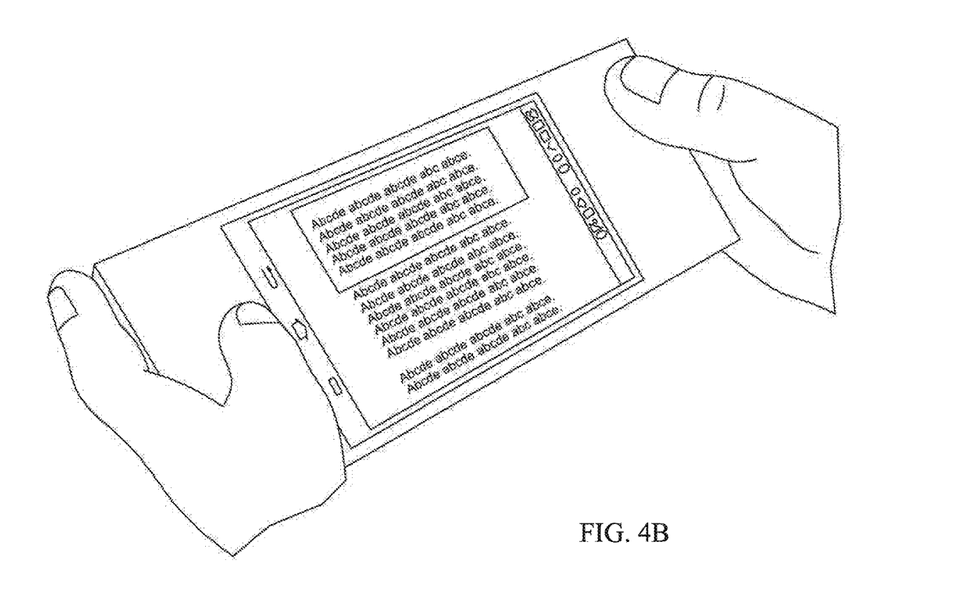
FIG. 4B is a photograph of a flexible haptic smartphone showing use of item selection for scrolling a text, and off-screen scrolling for annotating items, according to one embodiment.

Text Navigation and Annotation: This application was inspired by the wear and tear of physical documents that results from handling and reading. FIG. 4B shows an e-reader application, which features a highlight function. Users scroll through off-screen content using rate control. Bending the device into a concave shape moves the text up; the opposite moves the text down. When the user clicks the button, the application switches from reading mode to highlight mode. When in this mode, users can use position control to highlight lines of text. Highlighted areas may be identifiable in two ways: visually via a brighter foreground color, as well as haptically through increased friction simulation. When scrolling, a highlighted area entering the viewport is experienced as having more friction, than its surrounding text. As a user scrolls, this change in texture allows the user to feel that he/she is passing a highlighted section—even when not attending visually or when scrolling quickly. The additional friction invites the user to pause at a previously highlighted section, like a dog ear on a page of a book invites the reader to open the book to that page.

Page Navigation: In one embodiment, the friction algorithm produces a burst (e.g., a duration of about 0.1 s) of white noise, wherein the shape of the noise burst resembles a sawtooth shape: the amplitude increases linearly from 0 db to peak value and then instantaneously drops back to 0 db at 0.1 s. A train of bursts is generated at a rate that is related to the speed of the page flips, with one burst being generated per page flip. The speed of page flips is linearly related to the extent of the bend as reported by the bend sensor. This gives the tactile sensation of feeling pages flip through the fingers, with the rate of the train of bursts representing the speed of navigation through the pages.

Figure 5:
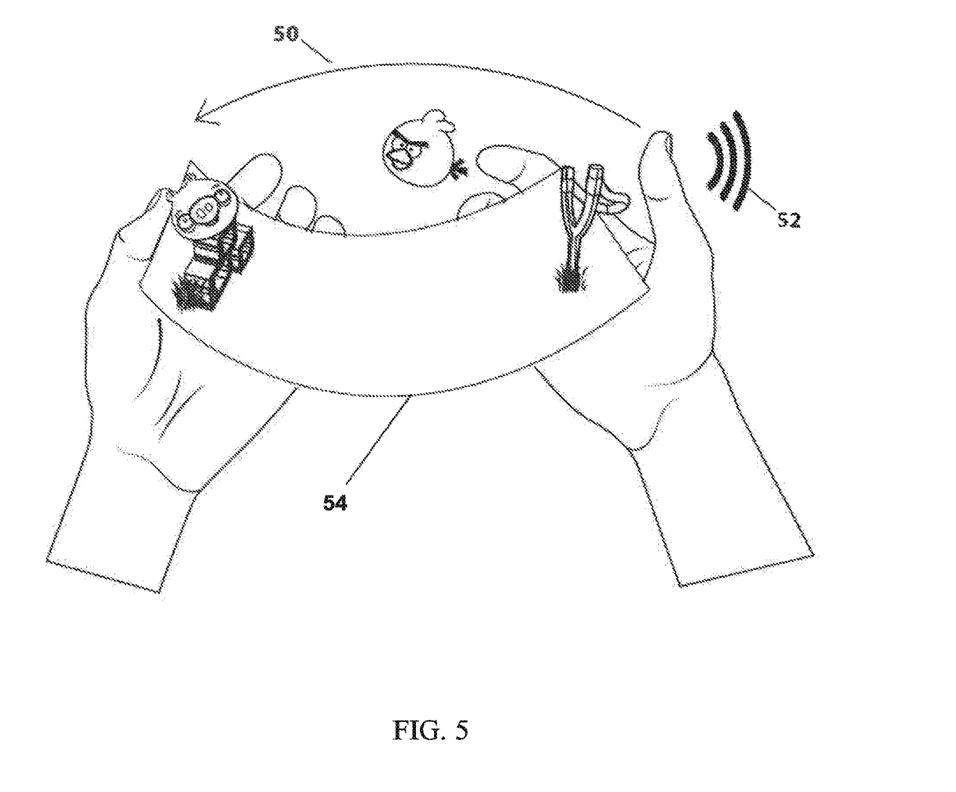
FIG. 5 is a diagram showing a game with haptic elastic feedback, according to one embodiment.

Haptic Physical Gaming Device: The bend sensors and inertial measurement unit (IMU) in the device allow for the device to sense its orientation and shape. This allows, among other things, fix gaming experiences that are truly imbued with physics. For example, when the game "Angry Birds™" is played on the device, a user can bend the side of the display to pull the elastic rubber band. To release the bird, the user releases the side of the display (FIG. 5). The velocity with which this occurs is sensed by the bend sensor and conveyed to a physics engine in the gaming application, sending the bird across the display 50 with the corresponding velocity. This provides the user with passive haptic feedback (depicted in the figure at 52) representing the tension in the rubber band. A haptic coil 54 embedded in the display provides active haptic feedback. A user quickly becomes proficient at the game because the device makes the user feel the physics of the gaining action in full realism. As the user pulls the right side of the display to release the bird, the user feels the display give way as if pulling a real rubber band. As the side of the display is released, the user feels and hears it snap, sending the bird flying towards its target on the other side of the display. This allows the user to estimate very precisely how to hit the target. As the bird hits, the user sees, hears, and feels the pig and the bricks tumble down the screen with great realism.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A method for providing haptic feedback on a flexible computing device, comprising:
   sensing flexing of the flexible computing device and generating a continuous series of pulses;
   modulating amplitude and frequency of the series of pulses in accordance with an amount of flexing of the flexible computing device;
   using the modulated pulses to produce vibrations through the flexible computing device;
   wherein the vibrations simulate a physical affordance of content displayed on the flexible computing device.

2. The method of claim 1,
   further comprising filtering the pulses; and
   using the filtered pulses to produce vibrations in the flexible computing device.

3. The method of claim 2, wherein filtering comprises:
   filtering the pulses using a band pass filter, wherein a center frequency of the band pass filter is adjusted in accordance with an amount of flexing of the flexible computing device.

4. The method of claim 1, wherein modulating comprises:
   increasing the amplitude of the pulses as the amount of flexing of the flexible computing device increases;
   wherein intensity of vibration of the flexible computing device increases as the amount of flexing of the flexible computing device increases.

5. The method of claim 3, including increasing the center frequency of the band pass filter as the amount of flexing of the flexible computing device increases.

6. The method of claim 1, wherein the simulation includes simulating stretching of a rubber band.

7. The method of claim 1, wherein the flexible computing device includes a flexible display.

8. The method of claim 1, comprising using a bend sensor to sense flexing of the flexible computing device.

9. The method of claim 1, comprising producing vibrations using at least one of: a voice coil, a piezo speaker, a magnetic speaker, and a vibration unit.

10. The method of claim 1, wherein the flexible computing device comprises a smartphone, a tablet personal computer, a personal digital assistant, a music player, a gaming device, or a combination thereof.

11. A flexible computing device, comprising:
    a sensor that senses flexing of the device;
    a pulse generator that generates a continuous series of pulses;
    a processor that modulates amplitude and frequency of the series of pulses in accordance with an amount of flexing of the flexible computing device as sensed by the sensor;
    an electromechanical device that produces vibrations in the flexible computing device from the modulated pulses.

12. The flexible computing device of claim 11, comprising a filter that filters the pulses.

13. The flexible computing device of claim 12, wherein the filter comprises a band pass filter, wherein a center frequency of the band pass filter is adjusted in accordance with the amount of flexing of the flexible computing device as sensed by the sensor.

14. The flexible computing device of claim 11, wherein amplitude of the pulses is increased as the amount of flexing of the flexible computing device increases;
    wherein intensity of vibration of the flexible computing device increases as the amount of flexing of the flexible computing device increases.

15. The flexible computing device of claim 13, wherein the center frequency of the band pass filter is increased as the amount of flexing of the flexible computing device increases.

16. The flexible computing device of claim 11, wherein the vibrations simulate stretching of a rubber band.

17. The flexible computing device of claim 11, wherein the flexible computing device includes a flexible display.

18. The flexible computing device of claim 17, wherein the vibrations simulate a physical affordance of content displayed on the flexible computing device.

19. The flexible computing device of claim 11, wherein the electromechanical device comprises at least one of: a voice coil, a piezo speaker, a magnetic speaker, and a vibration unit.

20. The flexible computing device of claim 11, wherein the flexible computing device comprises a smartphone, a tablet personal computer, a personal digital assistant, a music player, a gaming device, or a combination thereof.

* * * * *